Feb. 22, 1966 P. D. CARLETON 3,236,293
HEAT PUMP SYSTEM
Filed Jan. 24, 1962 2 Sheets-Sheet 1

INVENTOR.
PAUL D. CARLETON
BY
ATTORNEY

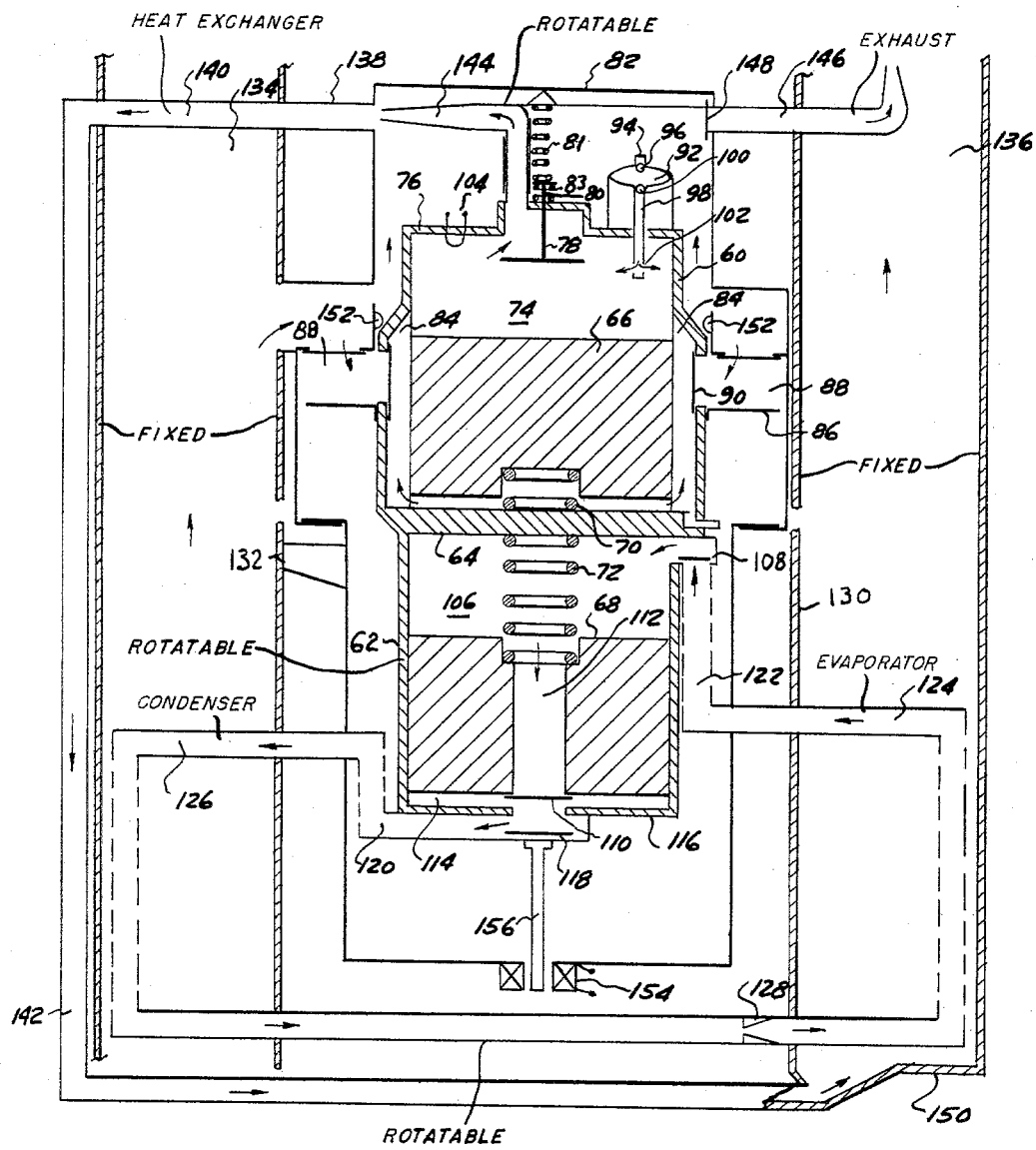

United States Patent Office 3,236,293
Patented Feb. 22, 1966

3,236,293
HEAT PUMP SYSTEM
Paul D. Carleton, 2210 N. Melborn, Dearborn, Mich.
Filed Jan. 24, 1962, Ser. No. 168,460
6 Claims. (Cl. 165—29)

This invention relates to a system for heating and cooling air, and more particularly to such a system employing a heat pump driven by a combustion engine.

Heat pumps are presently used to either heat or cool the air within a building. These pumps employ compression devices which add heat to air, and expansion devices which remove heat from air, in order to transfer heat between the air of a building and an external medium such as ambient air or a water supply. These pumps are normally driven by electric motors, and they suffer from the disadvantages of the high cost of electricity and their low efficiency when they must pump heat out of cold ambient air into warmer room air.

In order to overcome these disadvantages, it has been proposed to employ a combustion engine to drive the heat pump and to extract the heat of the engine's exhaust for use in the air-warming cycle. A system of this general nature is described in my co-pending patent application Serial No. 833,407, filed August 13, 1959, now Patent No. 3,135,318, issued June 2, 1964. In that application, the concept of pumping heat out of the exhaust into the conditioned air is introduced, as well as a novel valving system for achieving switching between the heating and cooling cycles.

The present invention utilizes a thermo-dynamic cycle which is essentially the same as that disclosed in the previous application and thereby achieves its basic economy. The present invention further provides a novel method of switching the system between the heating and cooling cycle. In the previous application, the change was achieved through a reversal of direction of refrigerant medium flow through a bi-directional expansion valve. The present invention provides a novel valving system which eliminates the need for refrigerant flow reversal and allows both the compression and expansion sections of the refrigerant system to operate in the same manner during both the heating and cooling cycle. The compressor and expansion unit may therefore be designed for a single purpose rather than a dual purpose with a resultant increase in efficiency.

A preferred embodiment of the present invention, which will subsequently be described in detail, utilizes an internal combustion engine driven compressor to pass refrigerant through a circuit comprising a compression chamber, an expansion valve, and an evaporation chamber. Heat exchangers are associated with both the compression chamber and the expansion chamber. A valving system directs air to be conditioned through the compression chamber heat exchanger during the heating cycle, and the expansion chamber heat exchanger during the cooling cycle, and passes the engine exhaust through the expansion chamber heat exchanger during heating and ambient air through the compression chamber heat exchanger during cooling. The same valving system directs the air which has been operated on back in to the enclosure and directs the product of the other heat exchanger to the atmosphere.

The compressor of the preferred embodiment is of a highly novel "free cylinder" type. It employs a pair of cylinders which are arranged linearly along a common axis and share a central partition. This cylinder assembly is free to move axially with respect to a pair of restrained pistons, one being disposed in each cylinder. The cylinder normally assumes a medium position wherein each piston is disposed centrally within its cylinder section. Spring bias means allows the cylinder to be displaced from this medium position when fuel is exploded in one of the chambers formed between a piston and a cylinder wall. The spring means returns the cylinder past its medium position to accomplish the return stroke. The refrigerant is compressed between the piston which does not directly experience its explosive force and its adjacent cylinder walls.

This entire engine structure, along with the compressor, condenser and evaporator, is rotatable, about its central axis, with respect to a fixed system that includes the conditioned air and ambient air flow passages. The rotation of the engine and refrigerator accomplishes all of the valving which is necessary to shift the system between its heating and cooling configurations.

It is therefore seen to be a primary object of the present invention to provide a heat pump system employing a refrigerant along with its necessary compression and expansion apparatus, wherein the shift between the heating and the cooling cycles may be simply accomplished by a valving system which redirects the exhaust, ambient, and conditioned air with respect to the condenser and evaporator heat exchanger.

Another object is to provide such a system where the refrigerant compressor is movable between a pair of positions and such movement reversibly effects all of the valving which is necessary for a shift between the heating and the cooling cycles.

A still further object is to provide such a system in which the compressor takes the form of a "free cylinder" engine having a configuration which allows it to be rotated between a pair of operative positions.

Other objects, advantages, and applications will be made apparent in the following detailed description of a preferred embodiment of the invention. The description makes reference to the accompanying drawings in which:

FIG. 2 represents a schematic drawing of a physical embodiment of a modification of the flow circuitry of FIG. 1.

Figure 1:
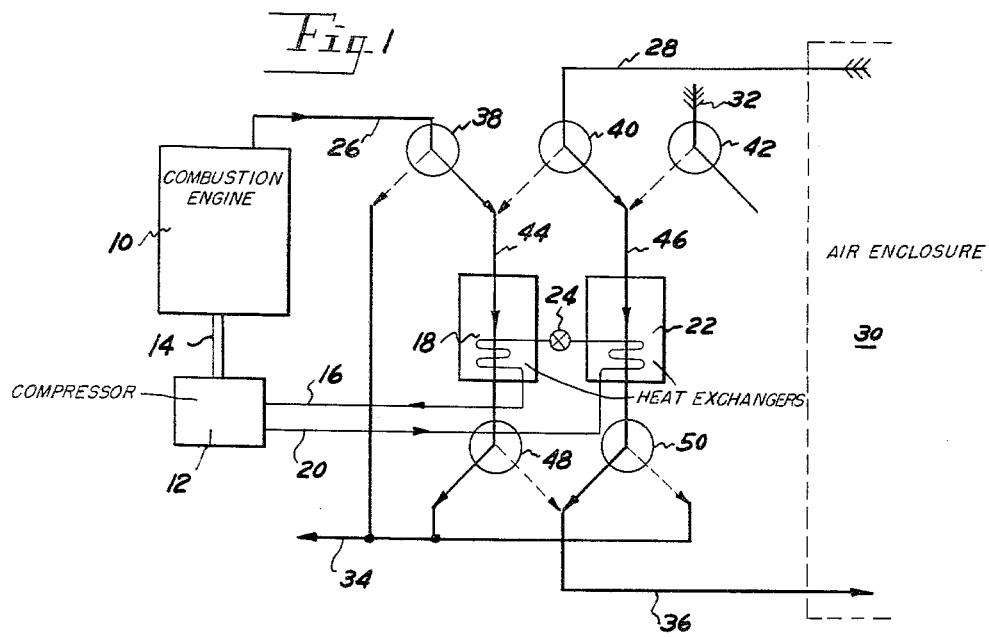
FIG. 1 represents a block diagram of a preferred embodiment of the invention.

Referring first to the block diagram of FIG. 1, the system is powered by a combustion engine 10 which drives a compressor 12 through its power shaft 14. In the subsequent description of FIG. 2, such engine and compressor will be described as being of the "free cylinder" variety. However, any fuel combustion engine might be employed and the drawing of FIG. 1 represents such an engine having a rotary output shaft 14 and employing any variety of rotary input compressor 12.

The compressor 12 operates upon a refrigerant which it receives through a line 16 from a heat exchanger 18 centered about the evaporator coil of the heat pump system. The compressor 12 in turn provides its output through a line 20 to a condenser coil of the system enclosed in a heat exchanger 22. An expansion valve 24 connects the condenser heat exchanger 22 with the evaporator heat exchanger 18.

Each of the heat exchangers 18 and 22 has a single air passage. In the evaporator 18, heat is extracted from the fluid travelling through the passage and is absorbed in the expanding refrigerant. Similarly, heat from the condensing refrigerant in the coil of the heat exchanger 22 is transferred to the air moving through the passage.

A valving arrangement has inputs from a line 26 which carries the exhaust of a combustion engine 10, from a line 28 which carries air from the enclosure 30 which is to be conditioned, and ambient air from the surrounding atmosphere through the line 32. The outputs of the system simply comprise a line 34 which feeds air to the atmosphere and a line 36 which returns air to the enclosure 30 which is to be conditioned.

The valving operates simultaneously and has only two primary positions: a heating position and a cooling position. The provision of only two operative positions and the condition of simultaneous movement of all valving circuitry results in a device which may be simply retained in a single integral structure.

The valve has three input sections 38, 40, and 42, which respectively receive the engine exhaust from the line 26, the air to be conditioned from the line 28, and ambient air from the line 32. In the position indicated with full lines, the engine exhaust is directed to the line 44 which carries it to the evaporator heat exchanger 18. In this same position, the air to be conditioned is directed to a line 46 which carries it to the condenser heat exchanger 22. This constitutes the heating position and no use is made of the ambient air in line 32 which is blocked off in this position by the valve 42. In this heating position, the output of the evaporator heat exchanger 18 by a valve section 48 is directed to the atmosphere through the line 34 while the air passing through the condenser heat exchanger 22 through a valve section 50 is directed back into the enclosure 30 through the line 36.

During this heating cycle, the evaporator heat exchanger 18 extracts heat contained in the exhaust of the engine. This heat is removed from the refrigerant and transferred to the air to be conditioned in the condenser heat exchanger 22. In certain installations, it will be desirable to dilute the engine exhaust with ambient air in order to lower its temperature to a point suitable for use with the refrigeration system. A thermostatically controlled venting system might accomplish this purpose but does not represent a technique utilized in the preferred embodiment.

This technique of "pumping" the heat out of the exhaust or other combustion products allows a much higher percentage of the exhaust heat potential to be realized than would be the case if the exhaust air were merely passed through a heat exchanger in opposition to air to be conditioned as is done in present heat pump systems and in conventional furnaces. By "pumping" the exhaust, the ultimately discarded exhaust (line 34) is reduced to a much lower temperature than the exhaust in the competitive systems. This is of particular importance in relation to heat pump systems which extract heat from the ambient air during the heating cycle which have notoriously low efficiencies in this mode. Since the combustion engine may normally be operated at a lower cost than an electric motor, which is the conventional prime mover in present heat pump systems, the economic efficiency is much greater than an electric motor driven system.

During the cooling cycle, the valve section 38, 40, 42, 48 and 50 are all shifted to the positions shown in the dotted lines of FIG. 1. This causes the entire exhaust to be discarded to the atmosphere through the line 34 along with the output of the condenser heat exchanger 22. The output of the evaporator heat exchanger 18 is fed to the room to be conditioned after heat is extracted from it. During this cooling cycle, the valve 42 switches so as to provide ambient air through the condenser heat exchanger 22.

FIG. 2 discloses an embodiment of the invention which employs a flow circuitry substantially that of FIG. 1.

The heat pump is built about a "free cylinder" engine and a compressor. The engine employs a pair of concentric cylinders 60 and 62 which share a common wall 64. A first piston 66 is disposed within the cylinder 60 and a second piston 68 is disposed within the cylinder 62. The cylinder 60, along with its piston 66, acts as a prime mover while the cylinder 62, and its piston 68, acts as a compressor.

The pistons 66 and 68 are designed to remain fixed against longitudinal movement along their axes. This may be accomplished by a mechanical connection between either or both pistons and the frame of the machine or as shown the pistons may be longitudinally movable with their high mass minimizing the extent of this movement. This latter technique allows a completely sealed combustion chamber.

In an alternate embodiment (not shown), the pistons might be connected together by a rod passing through a seal in the central wall 64. In this alternate embodiment, the common wall 64 could constitute a diaphragm which is fixed to the cylinders at its periphery and to the rod at the center, thus allowing relative movement between the piston rod and cylinders. Furthermore, a wall could be placed between the diaphragm and cylinder 60 so that the variable chamber thus formed could function as a pump for the fuel injector.

In the preferred embodiment, the cylinders 60 and 62 are longitudinally movable with respect to the pistons 66 and 68 and the frame. The position of the pistons with respect to the cylinder is biased by a spring 70 which extends between piston 66 and the common wall 64 and a spring 72 which extends between the piston 68 and the common wall 64. The basic movement of the engine is an axial reciprocation of the cylinders 60 and 62 with respect to the pistons 66 and 68 and common wall 64, powered by explosions occuring in a chamber 74 formed between the piston 66 and one extreme wall 76 of the cylinder 60. The power cycle is of the two-stroke variety and in FIG. 2 the cycle is illustrated at a point in the end of the power stroke, wherein the cylinder 60 has moved so as to bring the piston 66 immediately adacent the common wall 64 and compress the spring 70 by a maximum amount.

As the cylinder 60 begins to move downwardly under the force of the spring 70, the combustion products are exhausted through a valve 78 formed in the cylinder wall 76. The stem 80 of the valve extends through the wall 76 and spring 81 and 83 and normally urge the valve to a closed position. However, when the cylinder 60 moves upwardly with respect to the piston 66, the spring causes the valve to open. As the cylinder 60 moves downwardly, air is admitted to the chamber 74 through ports 84 located on the sides of the piston. Air is forced into these ports from a simple pump mechanism comprising walls 86 which move with the cylinder 60 and thereby pressurize pump chambers 88. Pressurized air is also passed through the ports 84 from the conditioned air stream in a manner which will be subsequently noted. Ports 84 are closed off by pressure-sensitive valves 90 whenever the pressure in the chamber 74 exceeds that in the pumps 88.

On the downstroke of the cylinder 60, fuel is admitted into the intake port 84 by an injection mechanism which includes a diaphragm 92 having input from a fuel supply line 94 through a check valve 96, and having output into the chamber 74 through a tube 98 and a check valve 100. When the cylinder 60 lowers sufficiently to cause the end of the tube 98 to abut the top of the piston 60, the diaphragm 92 is closed forcing a measured amount of fuel into the chamber 74 through ports 102 on the sides of the tube 98. At an appropriate point in the cycle, the air fuel mixture in the chamber 74 is ignited by a glowplug 104 located in the upper wall of the cylinder 60. This action forces the cylinder 60 upwardly against the force of the then opened spring 70 and with the assistance of the then closed spring 72.

On the down stroke of the cylinder 60, refrigerant in a chamber 106 formed between the common wall 64 and the piston 68, is compressed. The refrigerant was previously admitted to the chamber 106 during the up stroke of the cylinder 60 through a valve 108. When the pressure on the refrigerant in the chamber 106 becomes sufficiently high, a valve 110 situated in a passage 112 which connects the two sides of the piston 68 opens and admits the refrigerant to a chamber 114 formed between piston 68 and the extreme wall 116 of the cylinder. On the up stroke of the cylinder, the refrigerant is compressed in the chamber 114 and when a sufficient pressure has been achieved, a valve 118 opens and admits refrigerant to a passage 120.

The valve 108 which closes off the refrigerant intake to the chamber 106 is situated at the end of a passage 122. This passage is connected to an evaporator 124 that communicates with a condenser 126 by means of an expansion valve 128. The condenser is, in turn, connected to the passage 120.

Thus the main function of the entire engine is to compress refrigerant into the condenser 126. The refrigerant then expands through the valve 128 and the evaporator 124, from which it is returned to the compressor. The condenser and evaporator structure is supported with respect to the engine by cylindrical walls 130 and supports 132. This entire structure is rotatable with respect to a passage 134 which transmits air to be conditioned and a passage 136 which carries ambient air or engine exhaust. An air propelling mechanism, such as a fan (not shown), is located in the passage 134 and the two ends of the passage are connected to the volume of air to be conditioned. Both the ends of the passage 136 are connected to the atmosphere. The stationary assembly also includes an exhaust passage 138 which includes a heat exchanger 140 and a conduit 142. The heat exchanger 140 is located in the conditioned air passage 134 and the conduit 142 connects to the output of the heat exchanger 140 and returns the air to the ambient air passage 136.

In FIG. 2, the engine is illustrated in its heating position. In that position an exhaust nozzle 144 directs the exhaust of the machine from valve 78 through the passage 138 and the heat exchanger 140. An alternate exhaust passage 146 is then blocked by a valve 148. During this heat cycle, indoor air is passed through the passage 134, wherein it absorbs heat from the condenser 126. It then passes over the heat exchanger 140 where it absorbs heat from the exhaust. This somewhat cooled exhaust is then carried through the passage 142 and over the evaporator 124 which absorbs the heat from the exhaust and then allows the exhaust to pass out to the atmosphere.

In order to convert to the cooling cycle, the condenser, evaporator and engine are rotated through 180 degrees so as to position the evaporator in the conditioned air passage 134 and the condenser in the ambient passage 136. This same motion directs the exhaust to the auxiliary exhaust passage 146 and blocks off the exhaust passage 138 with a valve 148.

The auxiliary exhaust passage 146 projects the combustion products into the atmosphere from a location central to the end of the ambient air passage 136. It thus acts as a venturi to aid the flow of air through the passage 136. A valve 150 which is located in the lower end of the passage 136 is opened during cooling and partially closed during heating so as to aid the efficiency of the apparatus.

Air from the pumps 88 is allowed to pass through seals 152 during the up stroke of the cylinder 60 in order to cool the sides of the cylinder. This air is drawn into the passage 138 along with the exhaust products through the exhaust nozzle 144 during the heating process. It thereby dilutes the heat of the exhaust and maintains the machine in a satisfactory thermo-dynamic range.

The engine may be started by reciprocating the cylinder 60 at a frequency consonant with its natural harmonic frequency. This may be accomplished by passing an alternating current of that frequency through a solenoid 154. A ferro-magnetic armature rod 156 which extends through the solenoid 154 will thus be oscillated within the solenoid at a harmonically varying rate and will transmit its oscillations to the cylinder 60. In that embodiment wherein the two pistons are connected by a rod, the solenoid could surround and be operative on that rod.

Figure 3:
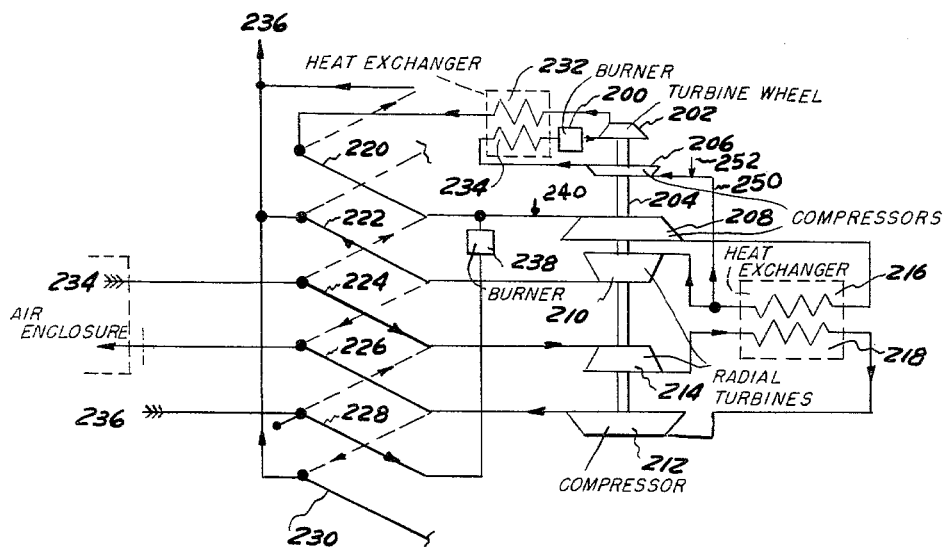
FIG. 3 is a block diagram of an embodiment of the invention which constitutes a modification of, and operates on an air cycle.

FIG. 3 discloses an embodiment of the present invention which does not use a refrigerant but rather employs air and the exhaust of the powering combustion engine as working fluids. Thus the air to be conditioned is expanded or compressed in order to cool or heat it and heat is extracted from the engine exhaust by expanding it and passing it through heat exchangers. This system shares with the embodiment of FIGS. 1 and 2 the concept of maintaining a fixed configuration compression and expansion system and shifting that system between heating and cooling cycles with a unique valve arrangement.

This embodiment of the invention is driven by a gas turbine engine which includes a burner 200 which supplies its output to a turbine wheel 202. The shaft 204 of the turbine includes a centrifugal compressor 206 which acts to compress the input to the burner 200; a first drive pair consisting of a centrifugal compressor 208 and a radial turbine 210; and a second drive pair consisting of a centrifugal compressor 212 and a radial turbine 214. The output of the compressor 208 is connected to the input of the turbine 210 by means of a heat exchanger passage 216. A second heat exchanger passage 218, which operates in conjunction with passage 216, connects the output of the turbine 214 to the input of the compressor 212. Thus a first fluid may be passed through the compressor 208 where its temperature is increased and then through the heat exchanger passage 216 and the radial turbine 210 wherein it respectively gives up heat content and is expanded. A fluid to be heated is simultaneously passed through the radial turbine 214, the exchanger passage 218 and the centrifugal compressor 212, thus it both extracts heat in the exchanger and is compressed before being returned to the conditioned area. The valving group which directs the proper fluids to the system and which may be simply shifted between a heating and cooling cycle is diagrammatically illustrated as valves 220, 222, 224, 226, 228 and 230. In FIG. 3 the valving position for the heating cycle is illustrated in full lines while the cooling cycle is illustrated with phantom lines. During the heating cycle, the exhaust from the engine turbine 202 is passed through a heat exchanger passage 232 wherein it pre-heats the air supply of the burner 200 which is passed through the passage 234. The valve 220 then directs the exhaust to the centrifugal compressor 208, the heat exchanger passage 216, and the radial turbine 210. The valve 222 then directs the exhaust to the atmosphere 236. The work performed on the exhaust in the compressor 208 increases its heat content for utilization in the exchanger passage 216. A portion of the energy content of the exhaust emanating from the passage 216 is returned to the drive system by the turbine 210. It should be recognized that each of these elements adds something to the desirable cycle, but for economic reasons either set of the compressors or turbines could be eliminated from the system.

The valve 224 is simultaneously directing air to be conditioned and heated from the conditioned area 234 through the turbine 214, the exchanger passage 218, and the centrifugal compressor 212. The air to be conditioned thus receives heat in the exchanger and in the compressor and is returned to the conditioned area 234 by the valve 226. In order to increase the mass flow of the exhaust, outdoor air might be directed through the valve 228 to join with the exhaust passing through the compressor 208. An auxiliary burner 238 might add heat to this air in extremely cool weather. This heat would be almost completely recovered by the subsequent system.

A passage 250 is operative to connect the output side of the heat exchanger passage 216 with the compressor 206, thus supplying compressed, cool air and increasing the pressure drop across the turbine. Water may be injected into passage 250 by means of a circuit 252 so as to realize the efficiency advantage of wet compression. The heat energy employed in evaporating the water is recovered in the heat exchanger passage 216 and the turbine 210.

During the cooling cycle, water vapor may advantageously be injected into the air to be conditioned emanating from the valve 224 by injector 240. This vapor would increase the efficiency of the compressor 208, the heat exchanger passage 216, and the expansion turbine 210 in a manner well known to the art.

During the cooling cycle, all of the valves 220 through 230 are simultaneously shifted preferably by a thermostatic mechanism to redirect the air flow through the system. The exhaust of the engine is then directed by the valve 220 directly to the atmosphere 236. The valve 222 is simply shut off. The valve 224 is shifted to direct air to be conditioned from the area 234 to the circuit comprising the compressor 208, the heat exchanger passage 216 and the turbine 210. The valve 226 then redirects this cooled air to the dwelling area. Simultaneously outdoor air is directed by the valve 228 to the circuit comprising the turbine 214, the heat exchanger 216 and the compressor 212. The valve 230 redirects this output to the atmosphere.

It should be understood that this concept of "pumping" heat from combustion products and the valve means described here to accomplish it is not restricted to combustion engine driven compression refrigerant systems but is applicable to any combustion powered refrigerant system for "pumping" heat to a warmer temperature, e.g. absorption, steam turbine, or steam jet systems.

Having thus described my invention, I claim:

1. A heating and cooling system for an enclosed air volume, comprising: a combustion engine; a refrigerant pump driven by said engine; an evaporator coil having one end connected to the input of said refrigerant pump; a condenser coil having one end connected to the output of said refrigerant pump; an expansion valve connecting said evaporator coil and said condenser coil; a first heat exchanger including said evaporator coil; a second heat exchanger including said condenser coil; a source of air to be conditioned; and valving means operative to receive the exhaust of the engine, the air to be conditioned, and atmospheric air, said valving means having a first position, for heating, wherein engine exhaust is directed to the first heat exchanger and the air to be conditioned is directed to the second heat exchanger, and a second position, for cooling, wherein the air to be conditioned is passed through the first heat exchanger, the exhaust is vented to the atmosphere and atmospheric air is passed through the second heat exchanger.

2. A heat pump system comprising, in combination: a combustion engine; a refrigerant pump driven by said engine; a refrigerant circuit powered by said pump and including a condenser connected to provide the output of said pump, an evaporator connected to receive the input of the pump, and an expansion valve connecting said evaporator and said condenser coil; means including a first passage operative to carry air to be conditioned; means including a second passage; means for disposing said evaporator in either said first or second passage and said condenser in the opposite passage; and means for passing the engine exhaust through said second passage at such time as the evaporator is disposed therein and venting the exhaust to the atmosphere at other times.

3. A heating and cooling system for an enclosed air volume, comprising: a combustion engine; a refrigeration system powered by the combustion engine, means including first and second fluid passages connected by the refrigeration system in such a manner that heat can be "pumped" from the fluid in the first passage to a fluid in the second passage; a source of atmospheric air; and valving means operative to receive the exhaust of the combustion engine, the air from said enclosed air volume, and atmospheric air, said valving means having a first position, for heating, wherein combustion exhaust of said engine is directed to the first fluid passage and the air to be conditioned is directed to the second fluid passage, and a second position, for cooling, wherein the air to be conditioned is passed through the first fluid passage and atmospheric air is passed through the second fluid passage and the combustion exhaust is directed to the atmosphere.

4. A heating and cooling system for an enclosed air volume, comprising: a combustion engine; a fluid compressor driven by the engine; a fluid expansion device operating in conjunction with the compressor; a heat exchanger having means including two fluid passages; the fluid passages disposed in such a working relation to the compressor and the expansion device that heat can be "pumped" from a fluid in the first passage to a fluid in the second passage; a source of air to be conditioned; and valving means operative to receive the exhaust of the engine, the air from said enclosed air volume, and atmospheric air, said valving means having a first position, for heating, wherein engine exhaust is directed to the first fluid passage and the air from said enclosed air volume is directed to the second fluid passage, and a second position, for cooling, wherein the air from said enclosed air volume is passed through the first fluid passage and atmospheric air is passed through the second fluid passage and the engine exhaust is vented to the atmosphere.

5. A heating and cooling system for an enclosed air volume, comprising: a combustion engine; a fluid compressor driven by the engine; a condenser passage operative to receive compressed fluid from said compressor; and evaporator passage operative to deliver expanded fluid to said compressor; an expansion valve connecting said condenser passage and said evaporator passage; means including a first passage for ambient air; means including a second passage for air to be conditioned; a switching means having two positions; a first, heating position, wherein said condenser passage is disposed in operative relationship with said passage for air to be conditioned and said evaporator passage as positioned in operative relationship with said passage for ambient air, and a second, cooling position, wherein the condenser passage is disposed in operative relationship to said passage for ambient air and the evaporator passage is disposed in operative relationship with the passage for air to be conditioned; and means for directing the exhaust of the engine through said passage for unconditioned air when the switching arrangement is in the heating portion of the cycle and to the atmosphere when the switching arrangement is in the cooling portion of the cycle.

6. A heating and cooling system for an enclosed air volume, comprising: a unitary combustion engine driven refrigerant compressor; a condenser means including passage operative to receive compressed fluid from said compressor; means including an evaporator passage operative to deliver expanded fluid to said compressor; an expansion valve connecting said condenser passage and said evaporator passage; means including a first passage for ambient air; means including a second passage for air to be conditioned; a switching means having two positions, a first, heating position, wherein said condenser passage is disposed in operative relationship with said passage for air to be conditioned and said evaporator passage as positioned in operative relationship with said passage for ambient air, and a second, cooling position, wherein the condenser passage is disposed in operative relationship to said passage for ambient air and the evaporator passage is disposed in operative relationship with the passage for air to be conditioned; and means for directing the combustion engine exhaust through said passage for unconditioned air when the switching arrangement is in the heating portion of the cycle and to the atmosphere when the switching arrangement is in the cooling portion of the cycle.

References Cited by the Examiner

UNITED STATES PATENTS

| | | | |
|---|---|---|---|
| 2,263,476 | 11/1941 | Sunday | 165—29 X |
| 2,309,165 | 1/1943 | Candor | 165—29 |
| 2,405,411 | 8/1946 | Dybvig | 165—86 X |
| 2,471,123 | 5/1949 | Rouy | 165—62 |
| 2,491,461 | 12/1949 | Wood | 165—15 |
| 2,713,995 | 7/1955 | Arkoosh et al. | 165—29 |
| 2,755,072 | 7/1956 | Kreuttner | 165—62 X |
| 2,777,301 | 1/1957 | Kuhn | 165—62 X |

JAMES W. WESTHAVER, *Primary Examiner.*